United States Patent [19]

Thomson et al.

[11] Patent Number: 4,818,471

[45] Date of Patent: Apr. 4, 1989

[54] BWR FUEL ASSEMBLY CHANNEL WITH LOCALIZED NEUTRON ABSORBER STRIPS FOR LPRM CALIBRATION

[75] Inventors: Ronald M. Thomson, Monroeville; Rusi P. Taleyarkhan, Pittsburgh, both of Pa.

[73] Assignee: Westinghouse Electric Corp., Pittsburgh, Pa.

[21] Appl. No.: 83,402

[22] Filed: Aug. 10, 1987

[51] Int. Cl.⁴ .............................................. G21C 17/10
[52] U.S. Cl. ..................................... 376/254; 376/447; 376/258; 376/443
[58] Field of Search ............... 376/448, 419, 254, 255, 376/153, 438, 447, 258, 900, 305, 443

[56] References Cited

U.S. PATENT DOCUMENTS

| | | | |
|---|---|---|---|
| 2,994,657 | 8/1961 | Petrick | 376/448 |
| 3,349,004 | 10/1967 | Lass et al. | 176/78 |
| 3,663,366 | 5/1972 | Sauar | 376/447 |
| 3,802,995 | 4/1974 | Fritz et al. | 176/76 |
| 3,846,771 | 11/1974 | Young et al. | 340/195 |
| 3,852,661 | 12/1974 | Szabo et al. | 324/34 PS |
| 3,890,607 | 6/1975 | Pelenc et al. | 340/199 |
| 3,906,469 | 9/1975 | Kronk | 340/188 R |
| 4,045,283 | 8/1977 | Noyes et al. | 176/35 |
| 4,067,772 | 1/1978 | Kim . | |
| 4,142,934 | 3/1979 | Wild et al. | 376/448 |
| 4,155,807 | 5/1979 | Schreiber et al. | 176/78 |
| 4,246,048 | 1/1981 | Kawai et al. | 376/900 |
| 4,268,586 | 5/1981 | Hanneman et al. | 376/305 |
| 4,295,935 | 10/1981 | Anthony | 376/442 |
| 4,297,170 | 10/1981 | Leclercq | 376/438 |
| 4,318,776 | 3/1982 | Proll et al. | 376/254 |
| 4,418,036 | 11/1983 | Gjertsen | 376/438 |
| 4,448,745 | 5/1984 | Anthony | 376/448 |
| 4,478,786 | 10/1984 | Andersson et al. | 376/444 |
| 4,560,532 | 12/1985 | Barry et al. | 376/434 |
| 4,585,615 | 4/1986 | De Mario | 376/438 |
| 4,591,479 | 5/1986 | Weitzberg | 376/447 |
| 4,624,829 | 11/1986 | Jackson | 376/448 |
| 4,626,405 | 12/1986 | Field et al. | 376/448 |
| 4,636,352 | 1/1987 | Boyle | 376/419 |
| 4,645,643 | 2/1987 | Leclercq | 376/447 |
| 4,649,021 | 3/1987 | Taleyarkhan | 376/444 |
| 4,698,204 | 10/1987 | Taleyarkhan | 376/438 |

FOREIGN PATENT DOCUMENTS 1150423  7/1983  Canada .

Primary Examiner—Harvey E. Behrend

[57] ABSTRACT

A Local Power Range Monitor (LPRM) string is employed between BWR fuel assemblies arranged in side-by-side spaced positions. The string has a hollow tube and neutron detectors located therein at spaced axial locations and being adapted to provide local power monitoring information. The hollow string tube is adapted to receive a neutron flux sensitive probe for calibrating the detectors. Each fuel assembly has an outer hollow tubular channel surrounding fuel rods and spacers disposed within and axially along the channel and about the fuel rods. The spacers are composed of a material incapable of producing a localized change in neutron flux. Elements in the form of strips of a neutron absorber material are attached to the exterior of the channel of each fuel assembly at a respective corner thereon and located axially at different known positions therealong and adjacent to the hollow string tube. The material composing the strips is capable of producing a localized change in neutron flux such that, upon passage of the probe through the hollow string tube and past the strips, the probe will sense the neutron flux change being produced by each of the strips and thereby the position of the probe can be tracked as it is moved through the string tube.

7 Claims, 4 Drawing Sheets

BWR FUEL ASSEMBLY CHANNEL WITH LOCALIZED NEUTRON ABSORBER STRIPS FOR LPRM CALIBRATION

BACKGROUND OF THE INVENTION

1. Field of the Invention

The present invention relates generally to fuel assemblies for a nuclear reactor and, more particularly, is concerned with a boiling water reactor (BWR) fuel assembly having localized neutron absorber strips placed on its outer tubular channel for facilitating calibration of Local Power Range Monitor (LPRM) neutron flux detectors.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In nuclear reactors generally, a plurality of the fuel rods are grouped together to form a fuel assembly. A number of such fuel assemblies are typically arranged in a matrix to form a nuclear reactor core capable of a self-sustained, nuclear fission reaction. The core is submersed in a flowing liquid, such as light water, that serves as the coolant for removing heat from the fuel rods and as a neutron moderator. Specifically, in a BWR the fuel assemblies are typically grouped in clusters of four with one control rod associated with each four assemblies. The control rod is insertable between the fuel assemblies for controlling the reactivity of the core. Each such cluster of four fuel assemblies surrounding a control rod is commonly referred to as a fuel cell of the reactor core.

A typical BWR fuel assembly in the cluster is ordinarily formed by a N by N array of the elongated fuel rods. The bundle of fuel rods are supported in laterally spaced-apart relation and encircled by an outer tubular channel having a generally rectangular cross-section. Examples of such fuel assemblies are illustrated and described in U.S. Pat. Nos. (3,349,004) to Lass et al, (3,689,358) Smith et al, (3,802,995) Fritz et al, (4,560,532) Barry et al and (4,649,021) Taleyarkhan and in a Canadian Pat. No. (1,150,423) to Anderson et al.

A BWR core typically includes several LPRM strings dispersed throughout the core. These strings are located inbetween the corner locations of four fuel assemblies. Each string includes a hollow tube with four neutron detectors located at discrete axial locations. During reactor operation these detectors provide crucial local power monitoring information. However, the detectors need to be calibrated at specific time intervals with a movable tip probe that is inserted from the bottom of the core, into selected detector string tubes. This calibration is necessary for maintaining the accuracy/fidelity of the LPRM readings on the control console.

In a BWR core made up of General Electric (GE-8×8) fuel assemblies as the tip probe is inserted in the string tube, its relative position is evaluated from the location of neutron flux dips caused by Inconel fuel rod spacers located axially along the fuel assembly. The Inconel spacers, usually seven in number, act as neutron absorbers and hence such dips occur.

In reload situations where Westinghouse Electric (W-QUAD+) BWR fuel assemblies are used to replace selected General Electric BWR fuel assemblies, it is highly likely that Westinghouse fuel assemblies will end up replacing GE fuel assemblies at one of the LPRM string locations. The Westinghouse fuel assembly, designed for optimized fuel cycle cost benefits, employs an all-Zircaloy spacer design. However, these Westinghouse Zircaloy spacers will not produce local neutron flux dips like the GE Inconel spacers. Furthermore, the six Zircaloy spacers in the adjacent fuel rod subassembly of the Westinghouse fuel assembly are located at axial positions different from the axial positions of the seven Inconel spacers in the GE fuel assembly. Hence, proper positioning of the tip probe for calibration purposes becomes impossible with current plant setup. Such a situation could lead to NRC-imposed uncertainty penalties in the form of plant derates.

Consequently, a need exists for an effective means of providing an indicator for locating the LPRM detectors in plants where GE BWR fuel assemblies are replaced with Westinghouse BWR fuel assemblies.

SUMMARY OF THE INVENTION

The present invention provides an improvement which is designed to satisfy the aforementioned needs. The technique underlying the present invention relates to providing an improvement in the form of a plurality of local neutron absorber strips, for instance made of a material containing boron, hafnium and/or silver, at axial locations on the exterior of the outer channel of the Westinghouse BWR fuel assembly which correspond to the axial positions of the Inconel spacers of the GE BWR fuel assembly. This ensures compatibility of the Westinghouse BWR fuel assembly design with the existing GE fuel assembly design in a reload core.

The above technique provides effective positioning of the tip probes for calibration purposes and eliminates uncertainty-related penalties for the Westinghouse BWR fuel assembly design in reload BWR cores. An additional benefit attributed to the above technique is the assurance of proper fuel assembly orientation. That is, the corner where absorber strips are attached can be used for assuring proper orientation of the Westinghouse BWR fuel assembly in a reload BWR core. The relatively small amount of neutron absorber strips used is estimated to cause a negligible impact on nuclear fuel cycle cost. Further, structural, thermal-hydraulic and LOCA performance areas would also remain unaffected.

Accordingly, the present invention is set forth in the combination of at least one Local Power Range Monitor (LPRM) string and a plurality of fuel assemblies arranged in side-by-side spaced positions about the string. The LPRM string has a hollow tube and a plurality of neutron detectors located therein at spaced axial locations and being adapted to provide local power monitoring information. The hollow tube of the string is adapted to receive a neutron flux sensitive probe for calibrating the detectors. Each of the fuel assemblies has a plurality of spaced fuel rods, an outer hollow tubular channel surrounding the fuel rods and a plurality of spacers disposed within and axially along the channel and about the fuel rods so as to maintain them in side-by-side spaced relationship. The spacers of at least one of the fuel assemblies is composed of a material incapable of producing a localized change in neutron flux. The feature of the present invention is an improvement comprising a plurality of elements attached to the at least one fuel assembly and located axially at different known positions therealong and adjacent to the hollow tube of the string. Each of the elements is composed of a material capable of producing a localized change in neutron flux such that, upon passage of the probe through the hollow tube of the string and past the elements, the probe will sense the neutron flux change being produced by each of the elements and thereby the position of the probe can be tracked as it is moved through the string tube.

More particularly, the elements are attached to the exterior of the at least one fuel assembly channel at the different known positions therealong. Preferably, each element is in the form of a strip of the material. Further, the fuel assembly channel is rectangular in cross-section and has a corner located adjacent to the string tube. Each of the plurality of elements is attached about the corner of the fuel assembly channel.

These and other advantages and attainments of the present invention will become apparent to those skilled in the art upon a reading of the following detailed description when taken in conjunction with the drawings.

BRIEF DESCRIPTION OF THE DRAWINGS

In the course of the preceding discussion and following detailed description, reference has been and will be made to the attached drawings in which.

DETAILED DESCRIPTION OF THE INVENTION

Figure 1:
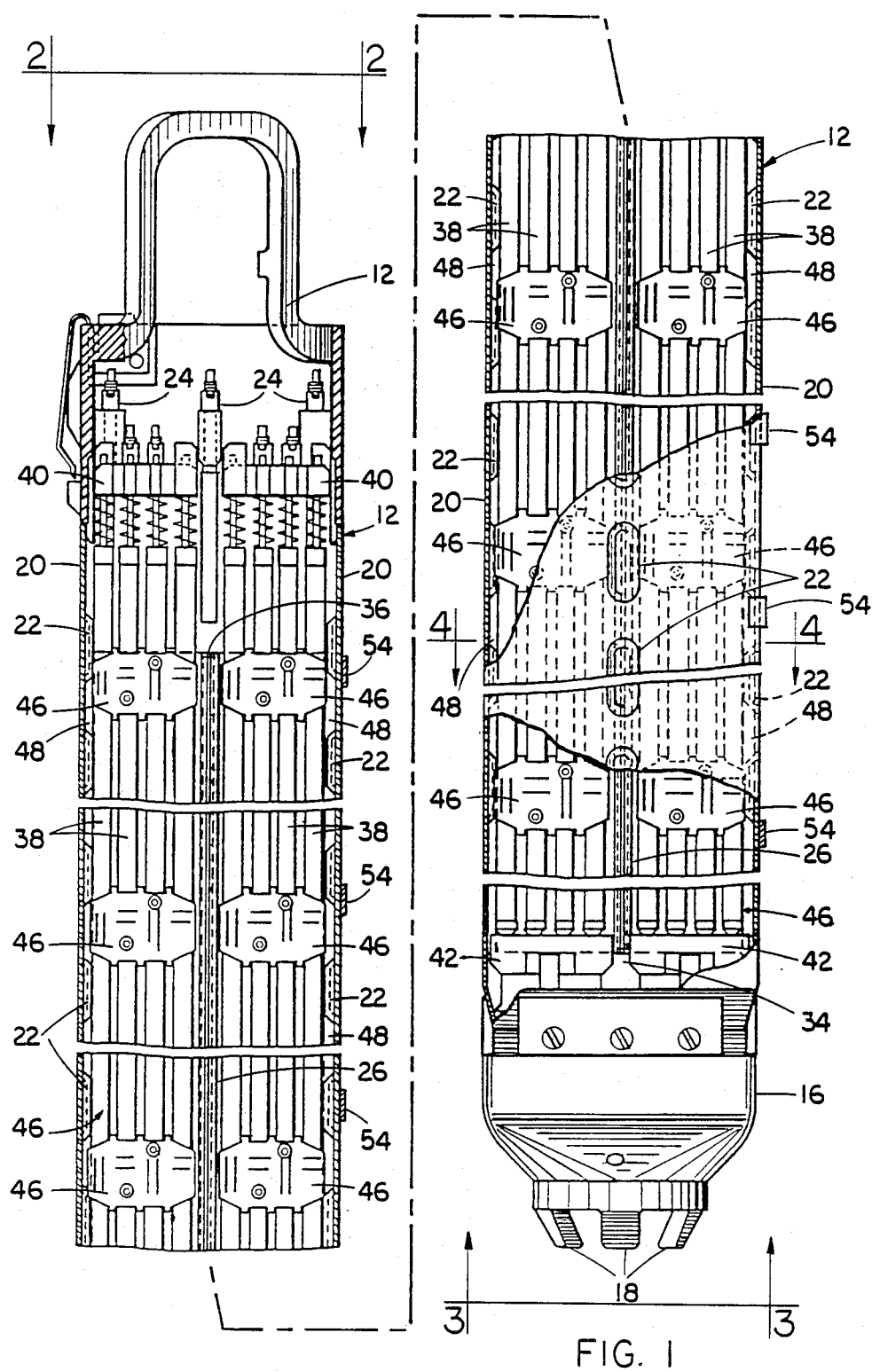
FIG. 1 is an elevational view, with parts broken away and sectioned for clarity, of a BWR nuclear fuel assembly, showing the plurality of local neutron absorber strips of the present invention employed on an outer tubular channel of the fuel assembly.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

IN GENERAL

Figure 2:
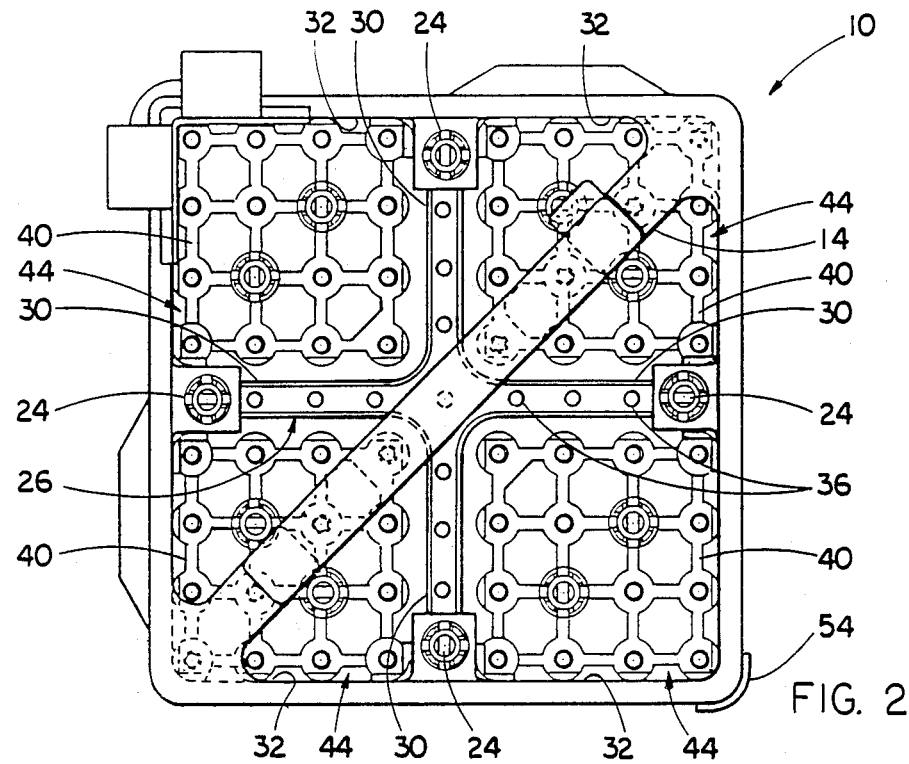
FIG. 2 is an enlarged top plan view of the fuel assembly as seen along line 2—2 of FIG. 1.
Figure 3:
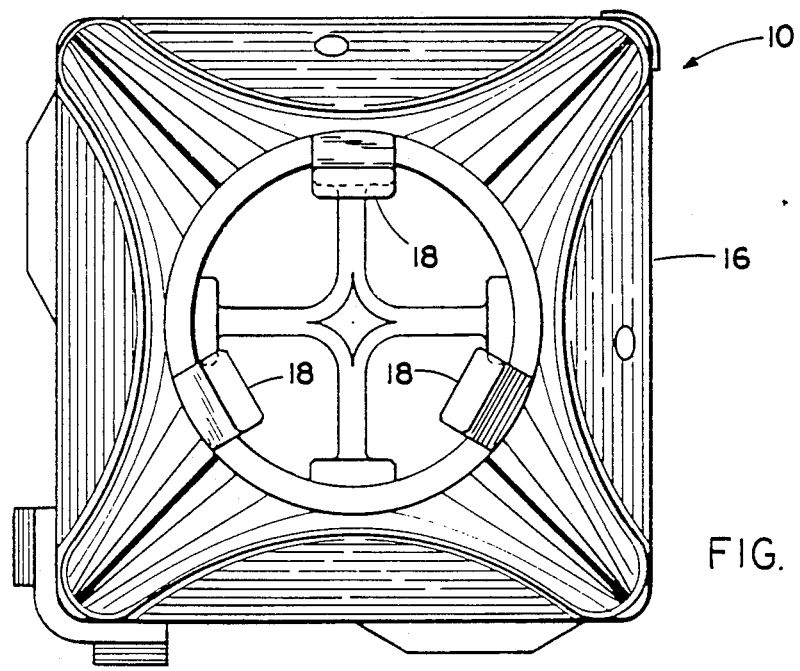
FIG. 3 is an enlarged bottom plan view of the fuel assembly as seen along line 3—3 of FIG. 1.

Referring now the the drawings, and particularly to FIGS. 1 to 3, there is shown a nuclear fuel assembly, generally designated 10 for a boiling water nuclear power reactor (BWR), in which the improvement of the present invention is incorporated. The fuel assembly 10 includes an elongated outer tubular flow channel 12 that extends along substantially the entire length of the fuel assembly 10 and interconnects an upper support fixture or top nozzle 14 with a lower base or bottom nozzle 16. The bottom nozzle 16 which serves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example in a spent fuel pool.

The outer flow channel 12 (also see FIG. 4) generally of rectangular cross-section is made up of four interconnected vertical walls 20 each being displaced about ninety degrees one from the next. Formed in a spaced apart relationship in, and extending in a vertical row at a central location along, the inner surface of each wall 20 of the outer flow channel 12, is a plurality of structural ribs 22. The outer flow channel 12, and thus the ribs 22 formed therein, are preferably formed from a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

Figure 4:
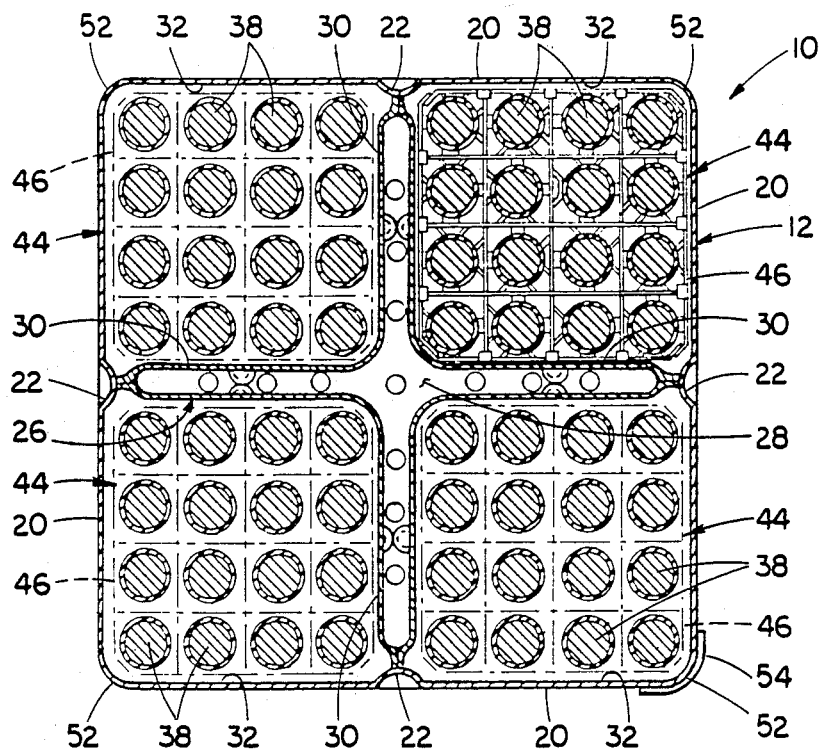
FIG. 4 is an enlarged cross-sectional view of the fuel assembly taken along line 4—4 of FIG. 1, showing a fuel rod bundle of the fuel assembly being separated into separate mini-bundles by a water cross with a grid surrounding one of the mini-bundles being shown in full, while the grids surrounding the other three mini-bundles are shown in outline form.

For improving neutron moderation and economy, a hollow water cross, as seen in FIGS. 1, 2 and 4 and generally designated 26, extends axially through the outer channel 12 so as to provide an open inner channel 28 for subcooled moderator flow through the fuel assembly 10. The hollow water cross 26 has a plurality of four radial panels 30 which extend in a cruciform configuration to divide the fuel assembly 10 into four separate elongated compartments 32. The water cross 26 is mounted to the angularly-displaced walls 20 of the outer channel 12. Preferably, outer elongated lateral ends of the water cross panels 30 are connected such as by welding to the structural ribs 22 along the lengths thereof in order to securely retain the water cross 26 in its desired central position within the fuel assembly 10. Further, the inner ends of the panels 30 together with the outer ends thereof define the inner central cruciform channel 28 which extends the axial length of the hollow water cross 26. Also, the water cross 26 has a lower flow inlet end 34 and an opposite upper flow outlet end 36 which each communicate with the inner channel 28 for providing subcoolant flow therethrough.

Disposed within the channel 12 is a bundle of fuel rods 38 which, in the illustrated embodiment, number sixty-four and form an 8×8 array. The fuel rod bundle is, in turn, separated into four mini-bundles thereof by the water cross 26. The fuel rods 38 of each mini-bundle, such being sixteen in number in a 4×4 array, extend in laterally spaced apart relationship between an upper tie plate 40 and a lower tie plate 42. The fuel rods 38 in each mini-bundle are connected to the upper and lower tie plates 40,42 and together therewith comprise a separate fuel rod subassembly 44 within each of the compartments 32 of the channel 12. A plurality of grids 46, such being six in number, are axially spaced along the fuel rods 40 of each fuel rod subassembly 46 and maintain the fuel rods in their laterally spaced relationships. The lower and upper tie plates 42,40 of the respective fuel rod subassemblies 44 have flow openings (not shown) defined therethrough for allowing the flow of coolant/moderator fluid into and from the separate fuel rod subassembly 44. Also, coolant flow paths provide flow communication between the fuel rod subassemblies 44 in the respective separate compartments 32 of the fuel assembly 10 through a plurality of openings 48 formed between each of the structural ribs 22 along the lengths thereof. Coolant flow through the openings 48 serves to equalize the hydraulic pressure between the four separate compartments 32, thereby minimizing the possibility of thermal hydrodynamic instability between the separate fuel rod subassemblies 44.

The above-described basic components of the BWR fuel assembly 10 are known in the prior art, being disclosed particularly in the above-cited U. S. patents to Barry et al and Taleyarkhan, and have been discussed in sufficient detail herein to enable one skilled in the art to understand the improvement of the present invention presented hereinafter. The BWR fuel assembly 10 just described is manufactured and sold by Westinghouse Electric Corporation, the assignee of the present invention and of the Barry et al and Taleyarkhan patents.

LPRM CALIBRATION STRIPS ON FUEL ASSEMBLY OUTER CHANNEL

Figure 5:
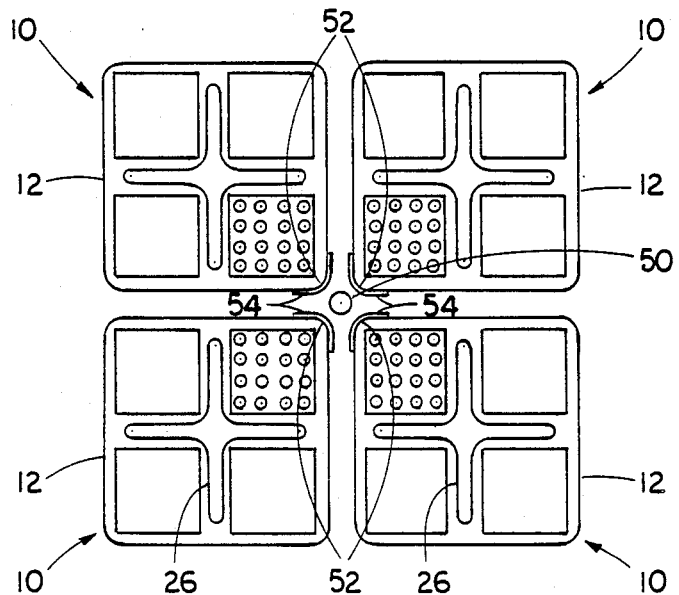
FIG. 5 is a schematic plan view of a group of four Westinghouse BWR fuel assemblies and a LPRM string located centrally therebetween, showing the neutron absorber strips located at the adjacent corners of the fuel assembly channels.

Referring now to FIG. 5, there is seen a schematic representation of a group of four Westinghouse BWR fuel assemblies 10 and a LPRM string 50 located centrally therebetween and spaced from the adjacent corners 52 of their rectangular channels 12. Also shown in FIG. 5 (and in FIGS. 1-4 as well) is the improvement of the present invention in the form of a plurality of angle-shaped strips 54 composed of neutron absorber material and located about and attached such as by welding to the adjacent corners 52 of the fuel assembly channels 12. The strips 54 are placed on the outer tubular channels 12 of the above-described Westinghouse BWR fuel assemblies 10 at the axially spaced locations shown in FIG. 6 for facilitating calibration of Local Power Range Monitor (LPRM) neutron detectors 56 contained within a hollow tube 58 of the LPRM string 50.

More specifically, as is conventionally known, the detectors 56 are adapted to provide local power monitoring information during reactor operation. Also, the hollow tube 58 of the string 50 is adapted to receive a conventional neutron flux sensitive probe 60 at selected times for calibrating the detectors 56.

Figure 6:
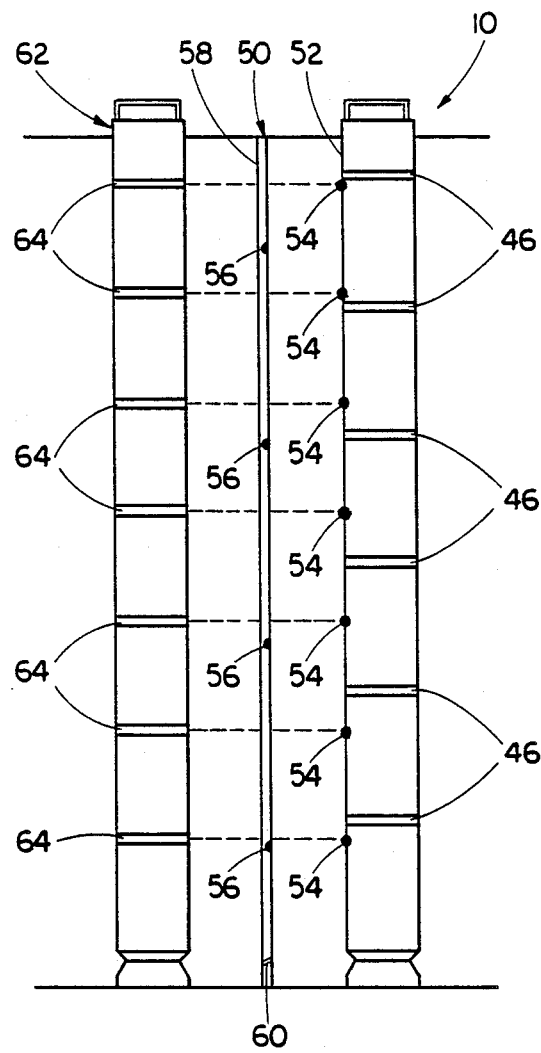
FIG. 6 is a schematic elevational view of a GE BWR fuel assembly with Inconel spacers, a Westinghouse BWR fuel assembly with Zircaloy spacers and a LPRM string located therebetween, showing the axial positions of the neutron absorber strips on the Westinghouse fuel assembly channel in alignment with the axial positions of the Inconel spacers in the GE BWR fuel assembly.

Also in FIG. 6 is a schematic representation of a GE BWR fuel assembly 62 with the axially spaced Inconel sacers 64. The axial positions of the neutron absorber strips 54 on the Westinghouse fuel assembly channel 12 are in alignment with the axial positions of the Inconel spacers 64 in the GE BWR fuel assembly 62. The spacers or grids 46 of the Westinghouse fuel assembly 10 by being composed of a material incapable of producing a localized change in neutron flux and by being located at different axial positions than the Inconel spacers 64 of the GE BWR fuel assembly 62 are thus not capable nor adaptable for serving the purpose of the Inconel spacers 64 with respect to the probe 60 when the GE BWR fuel assembly 62 is replaced in a reactor core by the Westinghouse fuel assembly 10. However, the improvement in the form of the strips 54, being composed of neutron absorber material, such as material containing boron, hafnium and/or silver, does adequately serve such purpose. By each strip 54 being composed of a material capable of producing a localized change in neutron flux, then upon passage of the probe 60 through the hollow tube 58 of the string 50 and past the strips 54, the probe 60 will sense the neutron flux change being produced by each strip and thereby the position of the probe can be tracked as it is moved through the string tube.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the forms hereinbefore described being merely a preferred or exemplary embodiment thereof.

We claim:

1. In the combination of at least one Local Power Range Monitor (LPRM) string and a plurality of fuel assemblies arranged in side-by-side spaced positions about said string, said LPRM string having a hollow tube and a plurality of neutron detectors located therein at spaced axial locations for providing local power monitoring information, said hollow tube of said string for receiving a neutron flux sensitive probe to calibrate said detectors, each of said fuel assemblies having a plurality of spaced fuel rods, an outer hollow tubular channel surrounding said fuel rods and a plurality of fuel rod spacers disposed within and axially along said channel and about said fuel rods so as to maintain them in side-by-side spaced relationship, all of said spacers of at least one of said fuel assemblies being composed solely of a material incapable of producing a localized change in neutron flux, the improvement which comprises:

a plurality of elements attached to the exterior of said channel of said at least one fuel assembly so as to be spaced from and in non-contacting relation with said channels of adjacent fuel assemblies and with said fuel rods of said one fuel assembly, located axially at different preselected positions therealong at each of which position it is desired to produce a localized change in netruon flux and located adjacent to and spaced from said hollow tube of said string, each of said elements being composed of a material capable of producing a localized change in neutron flux such that the sole function of said each element is to produce such localized change in neutron flux upon passage of the probe through said hollow tube of said string and past said elements, whereby the probe will sense the neutron flux change being produced by each of said elements and thereby the position of the probe can be tracked as it is moved through said string tube.

2. The combination as recited claim 1, wherien each of said elements is a strip of said material.

3. The combination as recited in claim 1, wherein:
said channel of said at least one fuel assembly is rectangular in cross-section and has a corner located adjacent to said string tube; and
each of said plurality of elements is arranged about said corner of said channel.

4. In the combination of at least one local Power Range Monitor (LPRM) string and a plurality of fuel assemblies arranged in side-by-side spaced positions about said string, said LPRM string having a hollow tube and a plurality of neutron detectors located therein at spaced axial locations for providing local power monitoring information, said hollow tube of said string for receiving a neutron flux sensitive probe calibrate said detectors, each of said fuel assemblies having a plurality of spaced fuel rods, an outer hollow tubular channel surrounding said fuel rods and a plurality of fuel rod spacers disposed within and axially along said channel and about said fuel rods so as to maintain them in side-by-side spaced relationship, each of said spacers of said fuel assemblies being composed solely of a material incapable of producing a localized change in neutron flux, the improvement which comprises:

a plurality of elements attached to the exterior of said channel of each of said fuel assembly so as to be spaced from and in non-contacting relation with said channels of adjacent fuel assemblies and with said fuel rods of said each fuel assembly, located axially at different preselected positions therealong at each of which position it is desired to produce a localized change in neutron flux and located adjacent to and spaced from said hollow tube of said string, each of said elements being composed of a material capable of producing a localized change in neutron flux such that the sole function of said each element is to produce such localized change in neutron flux upon passage of the probe through said hollow tube of said string and past said elements, whereby the probe will sense the neutron flux change being produced by each of said elements and thereby the position of the probe can be tracked as it is moved through said string tube.

5. The combination as recited in claim 4, wherein each of said elements is a strip of said material.

6. The combination as recited in claim 4, wherein:
each of said channels of said fuel assemblies is rectangular in cross-section and has a corner located adjacent to said string tube; and
each of said plurality of elements is attached about said corner of said each channel.

7. In the combination of at least one Local Power Range Monitor (LPRM) string and a plurality of fuel assemblies arranged in side-by-side spaced positions about said string, said LPRM string having a hollow tube and a plurality of neutron detectors located therein at spaced axial locations for providing local power monitoring information, said hollow tube of said string for receiving a neutron flux sensitive probe to calibrate said detectors, each of said fuel assemblies having a plurality of spaced fuel rods, an outer hollow tubular channel surrounding said fuel rods and a plurality of fuel rod spacers disposed within and axially along said channel and about said fuel rods so as to maintain them in side-by-side spaced relationship, each of said channels of said fuel assemblies being rectangular in cross-section and having a corner located adjacent to and spaced from said string tube, each of said spacers of said fuel assemblies being composed solely of a material incapable of producing a localized change in neutron flux, the improvement which comprises:

a plurality of angle-shaped metal strips attached to and extending about the exterior of said corner on each of said fuel assembly channels so as to be spaced from and in non-contacting relation with said channels of adjacent fuel assemblies and with said fuel rods of said each fuel assembly, located axially at different preselected positions therealong at each of which position it is desired to produce a localized change in neutron flux and located adjacent to and spaced from said hollow tube of said string, each of said strips being composed of a material capable of producing a localized change in neutron flux such that the sole function of said each strip is to produce such localized change in neutron flux upon passage of the probe through said hollow tube of said string and past said strips, whereby the probe will sense the neutron flux change being produced by each of said strips and thereby the position of the probe can be tracked as it is moved through said string tube.

* * * * *